(12) United States Patent
Lee

(10) Patent No.: US 12,427,909 B2
(45) Date of Patent: Sep. 30, 2025

(54) LAMP FOR VEHICLE AND METHOD THEREFOR

(71) Applicant: HYUNDAI MOBIS CO., LTD., Seoul (KR)

(72) Inventor: Hyun Soo Lee, Yongin-sl (KR)

(73) Assignee: Hyundai Mobis Co., Ltd., Seoul (KR)

( * ) Notice: Subject to any disclaimer, the term of this patent is extended or adjusted under 35 U.S.C. 154(b) by 63 days.

(21) Appl. No.: 18/436,937

(22) Filed: Feb. 8, 2024

(65) Prior Publication Data
US 2025/0050801 A1    Feb. 13, 2025

(30) Foreign Application Priority Data

Aug. 11, 2023    (KR) .......................... 10-2023-0105710

(51) Int. Cl.
| | | |
|---|---|---|
| *B60Q 1/08* | (2006.01) | |
| *F21S 41/63* | (2018.01) | |
| *F21S 41/65* | (2018.01) | |
| *F21S 41/692* | (2018.01) | |
| *F21W 103/60* | (2018.01) | |

(52) U.S. Cl.
CPC .............. *B60Q 1/08* (2013.01); *F21S 41/635* (2018.01); *F21S 41/65* (2018.01); *F21S 41/692* (2018.01); *B60Q 2400/40* (2013.01); *F21W 2103/60* (2018.01)

(58) Field of Classification Search
CPC ..... B60Q 1/08; B60Q 2400/40; F21S 41/635; F21S 41/692; F21S 41/65; F21W 2103/60
See application file for complete search history.

(56) References Cited

U.S. PATENT DOCUMENTS

| | | | | |
|---|---|---|---|---|
| 9,759,885 B2 * | 9/2017 | Yan | .................... | G02B 7/021 |
| 11,035,540 B2 * | 6/2021 | Kim | .................... | B60Q 1/549 |
| 11,194,020 B2 * | 12/2021 | Ahn | .................... | F21S 45/47 |
| 11,378,722 B2 * | 7/2022 | Wang | .................... | H04N 23/57 |
| 11,686,884 B2 * | 6/2023 | Shinohara | ............ | G02B 3/0062 359/614 |
| 11,746,982 B1 * | 9/2023 | Lee | .................... | F21S 41/47 362/520 |
| 12,234,959 B2 * | 2/2025 | Jeong | ................ | F21S 43/26231 |

(Continued)

FOREIGN PATENT DOCUMENTS

| | | | | |
|---|---|---|---|---|
| EP | 4273442 A1 * | 11/2023 | ............ | F21S 41/683 |
| WO | WO-2024204386 A1 * | 10/2024 | ............. | F21S 43/20 |

*Primary Examiner* — Adam D Houston
(74) *Attorney, Agent, or Firm* — NSIP Law

(57) ABSTRACT

A lamp for a vehicle and a method therefor are provided. The lamp includes optical systems to form a beam pattern by irradiating light onto a road surface, and an assembly unit to assemble and integrate the optical systems. Each of the optical systems includes: a light source part to generate light; a condensing lens part provided on a front side of the light source part to condense and output the light input from the light source part; a shield part formed to shield a portion of the light input from the condensing lens part; and an output lens part to output the light passing the shield part to the road surface. The beam pattern includes unit pattern areas formed by the optical systems, respectively, and orientation angle of light output from each of the optical systems on to the road surface is different from one another.

15 Claims, 10 Drawing Sheets

(56) References Cited

U.S. PATENT DOCUMENTS

| | | | |
|---|---|---|---|
| 2008/0225420 A1* | 9/2008 | Barrows | G06T 7/246 |
| | | | 359/850 |
| 2008/0259449 A1* | 10/2008 | Fruhmann | G01C 3/08 |
| | | | 359/425 |
| 2013/0076971 A1* | 3/2013 | Nishimoto | G02B 7/02 |
| | | | 359/764 |
| 2014/0078606 A1* | 3/2014 | Wu | G02B 7/025 |
| | | | 359/827 |
| 2015/0103407 A1* | 4/2015 | Chen | G02B 7/021 |
| | | | 359/601 |
| 2020/0339030 A1* | 10/2020 | Ahn | G01S 7/4812 |
| 2022/0196220 A1* | 6/2022 | Choi | F21S 43/26 |
| 2023/0358382 A1* | 11/2023 | Kang | F21S 43/14 |
| 2023/0358388 A1* | 11/2023 | Kang | F21V 5/007 |
| 2025/0050801 A1* | 2/2025 | Lee | F21S 41/143 |
| 2025/0060081 A1* | 2/2025 | Jin | F21S 41/285 |

\* cited by examiner

LAMP FOR VEHICLE AND METHOD THEREFOR

CROSS-REFERENCE TO RELATED APPLICATION(S)

This application claims the benefit of priority under 35 USC § 119 of Korean Patent Application No. 10-2023-0105710, filed in the Korean Intellectual Property Office on Aug. 11, 2023, the entire contents of which are incorporated by reference for all purposes.

BACKGROUND

1. Field

The present disclosure relates to a lamp for a vehicle.

2. Description of Related Art

A vehicle includes a puddle lamp, a headlamp, a rear lamp, and the like, and these lamps may include a welcome light. The welcome light illuminates light to inform a driver of a location of the vehicle and enhance a sense of luxury of the vehicle when the driver unlocks a door or approaches the vehicle with a key.

Conventionally, a lamp for a welcome light is configured to output light from one optical system to one area. Accordingly, it is difficult to implement various image patterns or animation drive patterns on a road surface.

As a measure for solving this problem, a method of constituting several optical systems in one lamp may be used. However, in this case, each projection area has to be subdivided, and the optical systems corresponding to the subdivided areas have to be disposed separately. Furthermore, in this disposition, a separate aiming structure has to be added to match an orientation angle of each optical system. According to the method, the number of optical system components and man-hours are increased. Accordingly, there is a need to develop a lamp that may implement various images without adding a separate aiming structure.

SUMMARY

The present disclosure has been made to solve the above-mentioned problems occurring in the prior art while advantages achieved by the prior art are maintained intact.

An aspect of the present disclosure provides a lamp for a vehicle that implements various pattern images or dynamic pattern images while including a plurality of optical systems but not requiring a separate aiming structure.

The technical problems to be solved by the present disclosure are not limited to the aforementioned problems, and any other technical problems not mentioned herein will be clearly understood from the following description by those skilled in the art to which the present disclosure pertains.

In a general aspect of the disclosure, a lamp for a vehicle, the lamp includes: a plurality of optical systems configured to form a beam pattern by irradiating light onto a road surface; and an assembly unit configured to assemble and integrate the plurality of optical systems, wherein each of the plurality of optical systems includes: a light source part configured to generate light; a condensing lens part provided on a front side of the light source part and configured to condense and output the light input from the light source part; a shield part formed to shield a portion of the light input from the condensing lens part; and an output lens part configured to output the light passing the shield part to the road surface, wherein the beam pattern includes a plurality of unit pattern areas formed by the plurality of optical systems, respectively, and wherein orientation angle of light output from each of the plurality of optical systems on to the road surface is different from one another.

Each of the plurality of optical systems may include: a board part coupled to the assembly unit, the light source part being mounted on the assembly unit, wherein the board parts provided in the plurality of optical systems are integrally formed on the same plane, wherein optical axes of the light source parts provided in the plurality of optical systems are formed to define the same angle with respect to the board parts, and wherein angles of the output lens part, the condensing lens part, and the shield part provided in any one optical system with respect to the board part are formed to be different from angles of the output lens part, the condensing lens part, and the shield part provided in the other optical systems with respect to the board part.

The assembly unit may include: a lens barrel coupled to the board part, wherein the lens barrel includes a slit part for assembling the condensing lens part, the shield part, and the output lens part.

The lamp may further include: a flange part accommodated in the lens barrel, and an end of which is inserted into the slit part, wherein the flange part includes: a plate-shaped condensing lens flange connecting the condensing lens parts provided in the plurality of optical systems, respectively; a plate-shaped shield flanges connecting the shield parts provided in the plurality of optical systems, respectively; and a plate-shaped output lens flange connecting the output lens parts provided in the plurality of optical systems, respectively.

The lens barrel may include: a pair of assembly plates, in which the slit parts extending in an upward/downward direction are formed concavely on facing surfaces thereof; a coupling plate bent and extending from a rear end of the assembly plate, and coupled to the board part; and a lower plate provided at a lower end of the assembly plate.

The slit parts may include: a condensing lens slit, in which a periphery of the condensing lens flange is inserted; a shield slit, into which a periphery of the shield flange formed on a front side of the condensing lens slit to be spaced apart therefrom is inserted; and an output lens slit, into which a periphery of the output lens flange formed on a front side of the shield slit to be spaced apart therefrom is inserted.

A spacing space may be formed between an outer surface of the flange part and an inner surface of the slit part is formed when the optical system and the assembly unit are assembled.

The assembly unit may include: a barrel clip assembled on an upper side of the lens barrel; and a fixing pad part interposed between the lens barrel and the barrel clip, and including a porous material being elastic and flexible, wherein the fixing pad part is configured to be deformed by a pressing force by the barrel clip and be inserted into the spacing space to fix a location of the flange part when the plurality of optical systems and the assembly unit are assembled.

The lens barrel may include: an insertion boss protruding from an outer surface of the assembly plate, wherein the barrel clip includes: a cover part covering an upper side of the lens barrel, and configured to press the fixing pad part; and an insertion part extending downward from an end of the cover part in a leftward/rightward direction, and inserted into and coupled to the insertion boss.

The output lens part may include: a primary lens disposed on a front side of the shield part; and a second lens disposed on a front side of the primary lens, and a type of which is different from that of the primary lens, wherein types of the condensing lens parts respectively provided in the plurality of optical systems are the same, wherein types of the shield parts respectively provided in the plurality of optical systems are the same, and wherein types of the output lens parts respectively provided in the plurality of optical systems are the same.

In another general aspect of the disclosure, a method of irradiating light by a vehicle, includes: providing a plurality of optical systems configured to forming a beam pattern by irradiating light onto a road surface; providing an assembly unit configured to assemble and integrate the plurality of optical systems; generating light by a light source of each of the optical systems; outputting the light input from the light source part by a condensing lens part provided on a front side of the light source part of each of the optical systems; shielding a portion of the light input from the condensing lens part by a shield part; outputting the light passing the shield part to the road surface an output lens part of each of the optical systems, wherein the beam pattern includes a plurality of unit pattern areas formed by the plurality of optical systems, respectively, and wherein orientation angle of light output from each of the plurality of optical systems on to the road surface is different from one another.

In yet another general aspect of the disclosure, a lamp for a vehicle, includes: a plurality of optical systems configured to form a beam pattern by irradiating light onto a road surface; a processor configured to control the plurality of optical systems; and an assembly unit configured to assemble and integrate the plurality of optical systems, wherein each of the plurality of optical systems includes: a light source part configured to generate light; a condensing lens part provided on a front side of the light source part and configured to condense and output the light input from the light source part; a shield part formed to shield a portion of the light input from the condensing lens part; and an output lens part configured to output the light passing the shield part to the road surface, and wherein the processor is further configured to: control the plurality of optical systems to form a plurality of pattern areas of the beam pattern, control orientation angle of light output from each of the plurality of optical systems on to the road surface to be different from one another.

The processor may be further configured to adjust intensity of light generated by the light source part of each of the plurality of optical systems, wherein light intensity of the plurality of pattern areas of the beam pattern may be uniform or non-uniform.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail according to the accompanying drawings.

Figure 1:
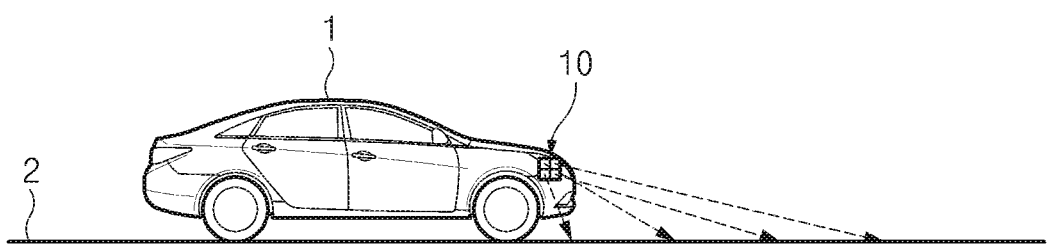
FIG. 1 is a view illustrating a state, in which a lamp for a vehicle is installed in a vehicle, according to an embodiment of the present disclosure.
Figure 2:
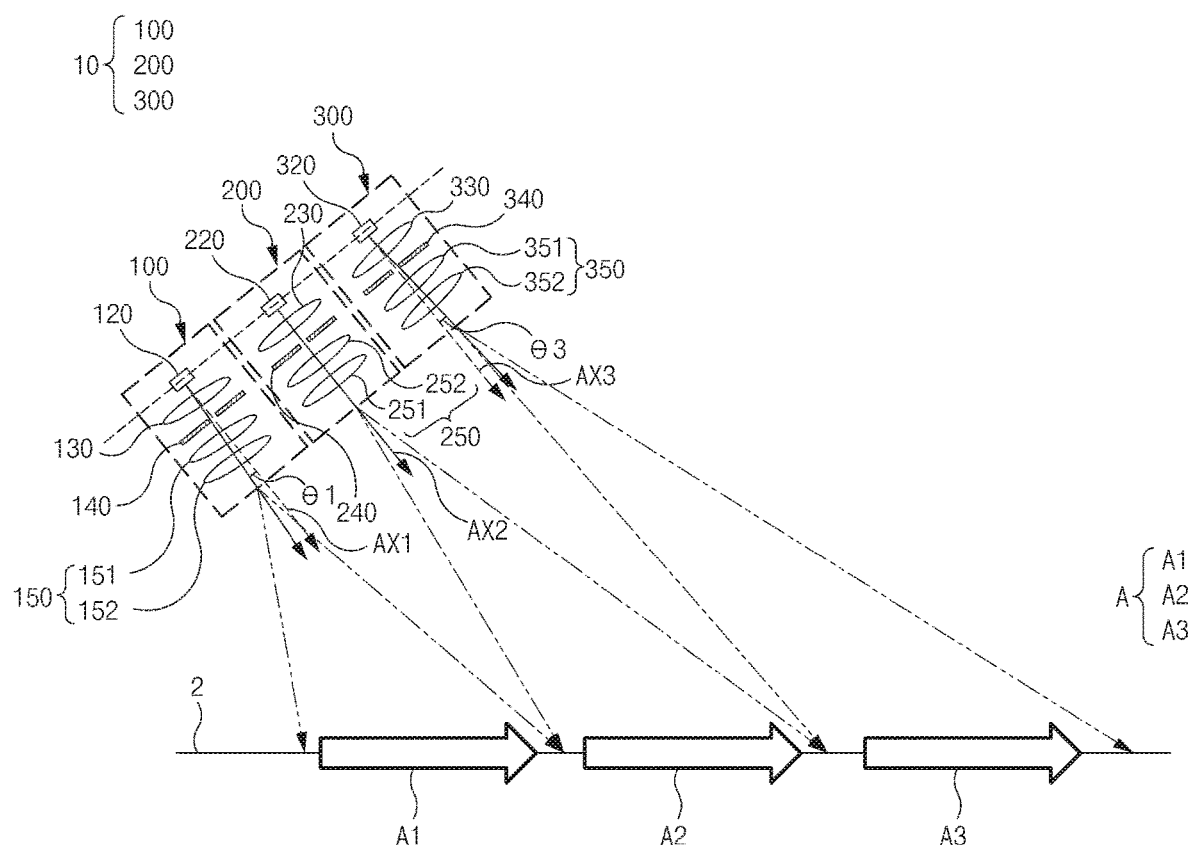
FIG. 2 is a view schematically illustrating a lamp for a vehicle according to an embodiment of the present disclosure, and is a view illustrating formation of a unit pattern area on a road surface by each optical system.
Figure 6:
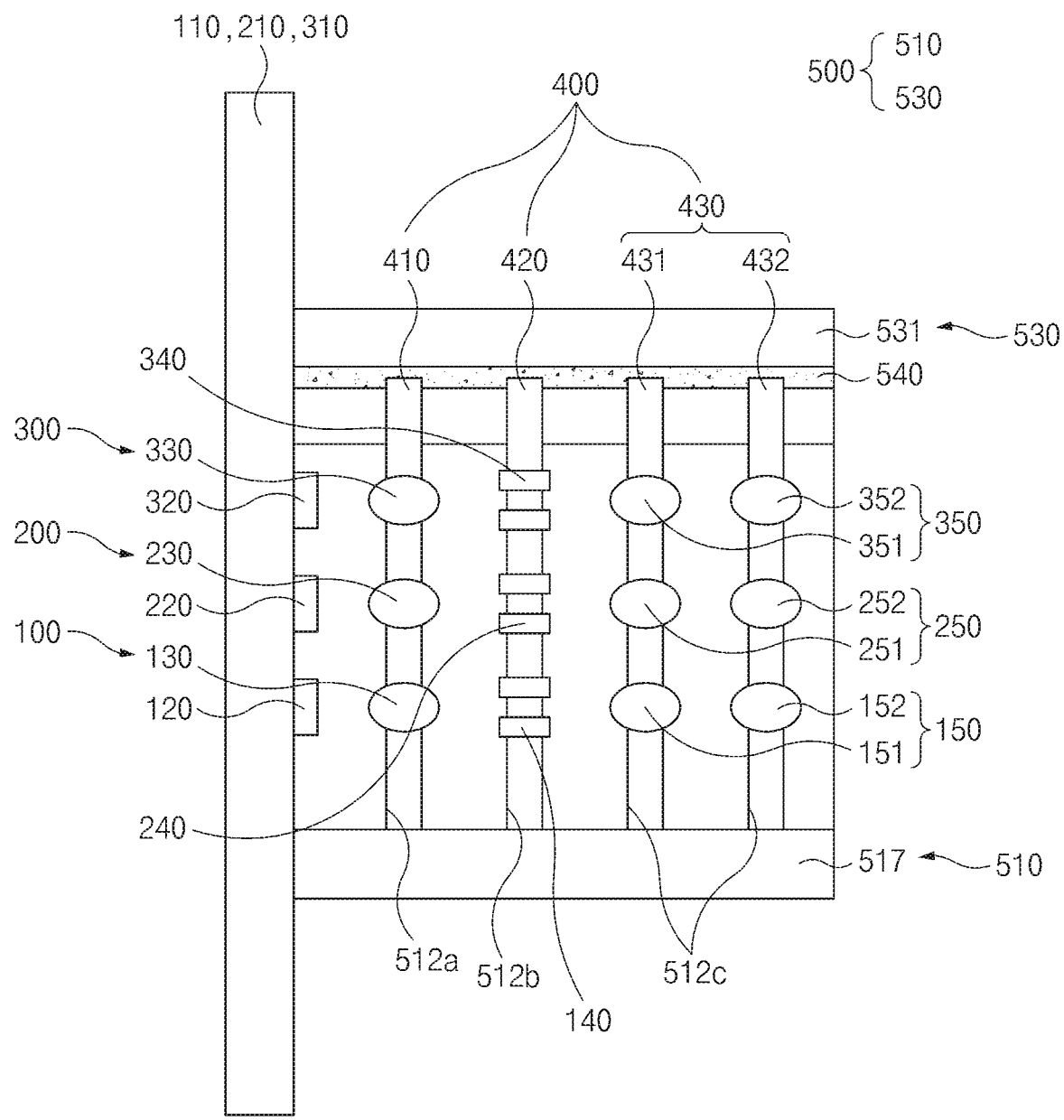
FIG. 6 is a side cross-sectional view of a lamp for a vehicle illustrated in FIG. 3, viewed from a lateral side.
Figure 7:
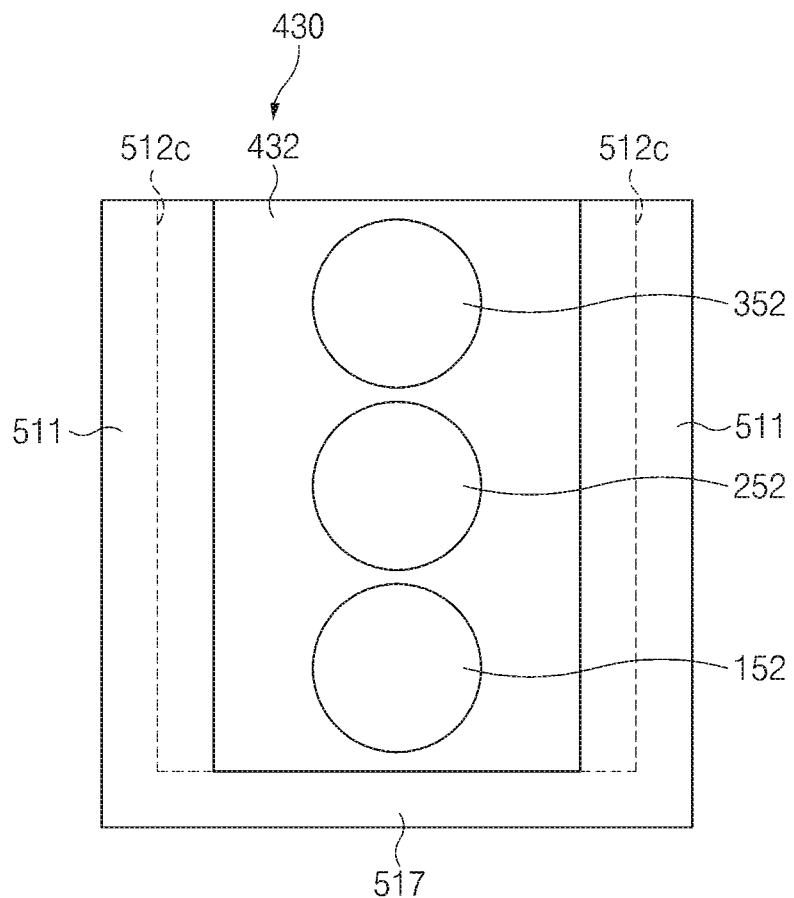
FIG. 7 is a front view of a lamp for a vehicle illustrated in FIG. 3, with a barrel clip omitted.

First, the embodiments that will be described below are suitable for helping to understand the technical features of a lamp for a vehicle, which is the present disclosure. However, the present disclosure is not limited to the embodiments described below or the technical features of the present disclosure are not limited by the described embodiments, and various modifications are possible within the technical scope of the present disclosure FIG. 1 is a view illustrating a state, in which a lamp for a vehicle is installed in a vehicle, according to an embodiment of the present disclosure, FIG. 2 is a view schematically illustrating the lamp for a vehicle according to an embodiment of the present disclosure, and is a view illustrating formation of a unit pattern area on a road surface by each optical system, FIG. 3 is a perspective view illustrating the lamp for a vehicle according to an embodiment of the present disclosure, FIG. 4 is an exploded perspective view of the lamp for a vehicle illustrated in FIG. 3, FIG. 5 is a perspective view illustrating the lamp for a vehicle illustrated in FIG. 3 with an assembly unit omitted, FIG. 6 is a side cross-sectional view of the lamp for a vehicle illustrated in FIG. 3, viewed from a lateral side, and FIG. 7 is a front view of the lamp for a vehicle illustrated in FIG. 3, with a barrel clip omitted.

Figure 3:
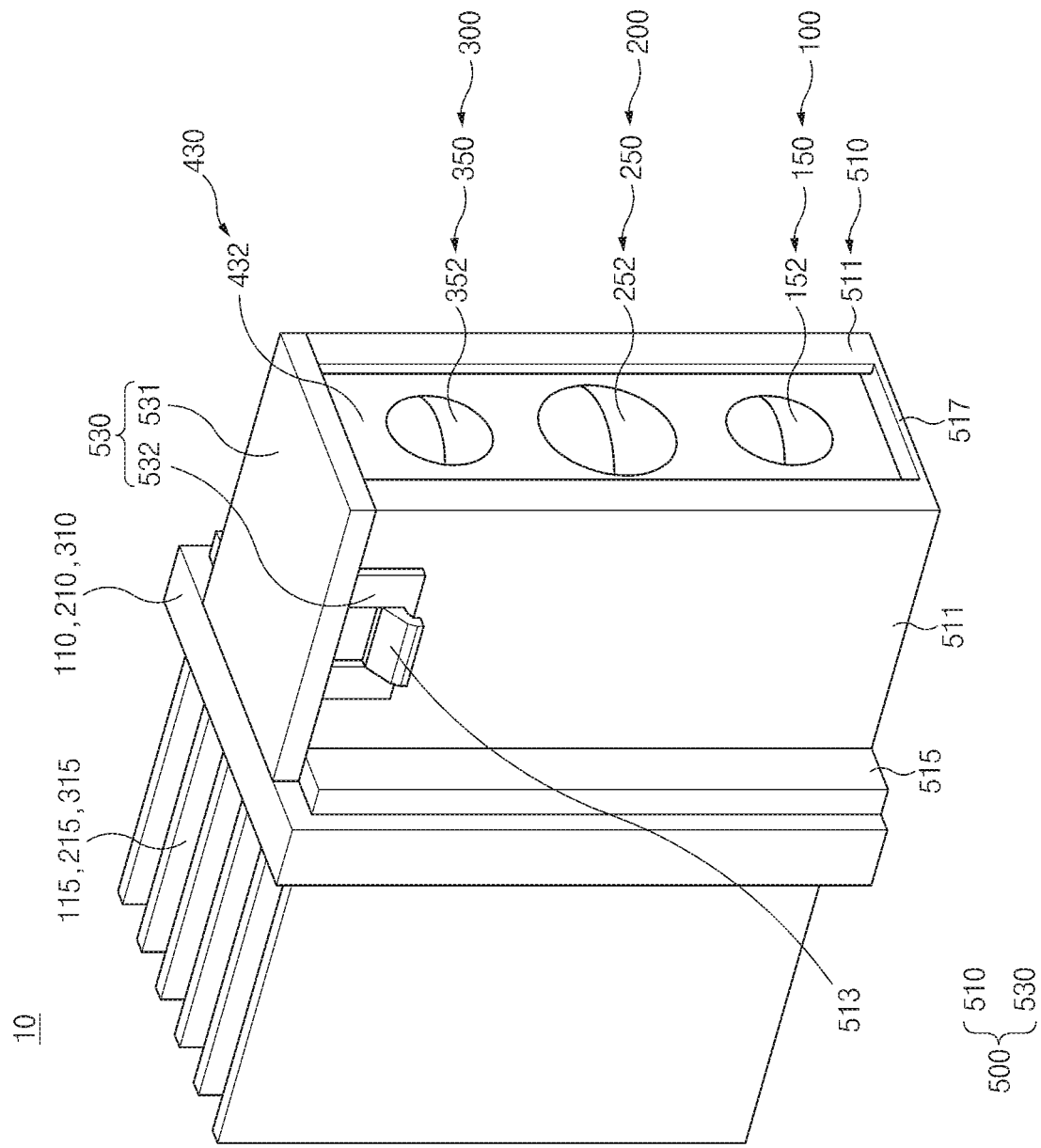
FIG. 3 is a perspective view illustrating a lamp for a vehicle according to an embodiment of the present disclosure.
Figure 4:
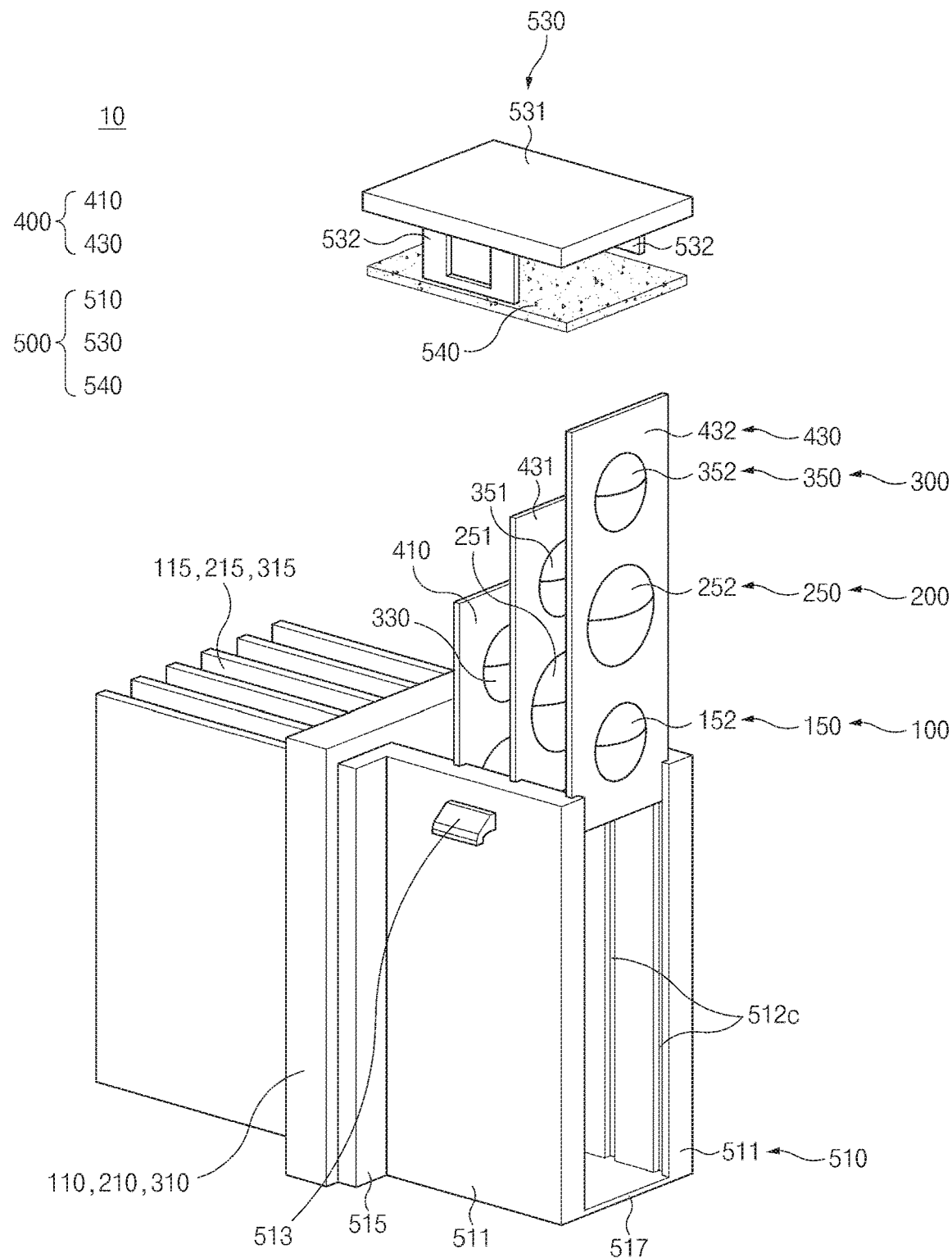
FIG. 4 is an exploded perspective view of a lamp for a vehicle illustrated in FIG. 3.
Figure 5:
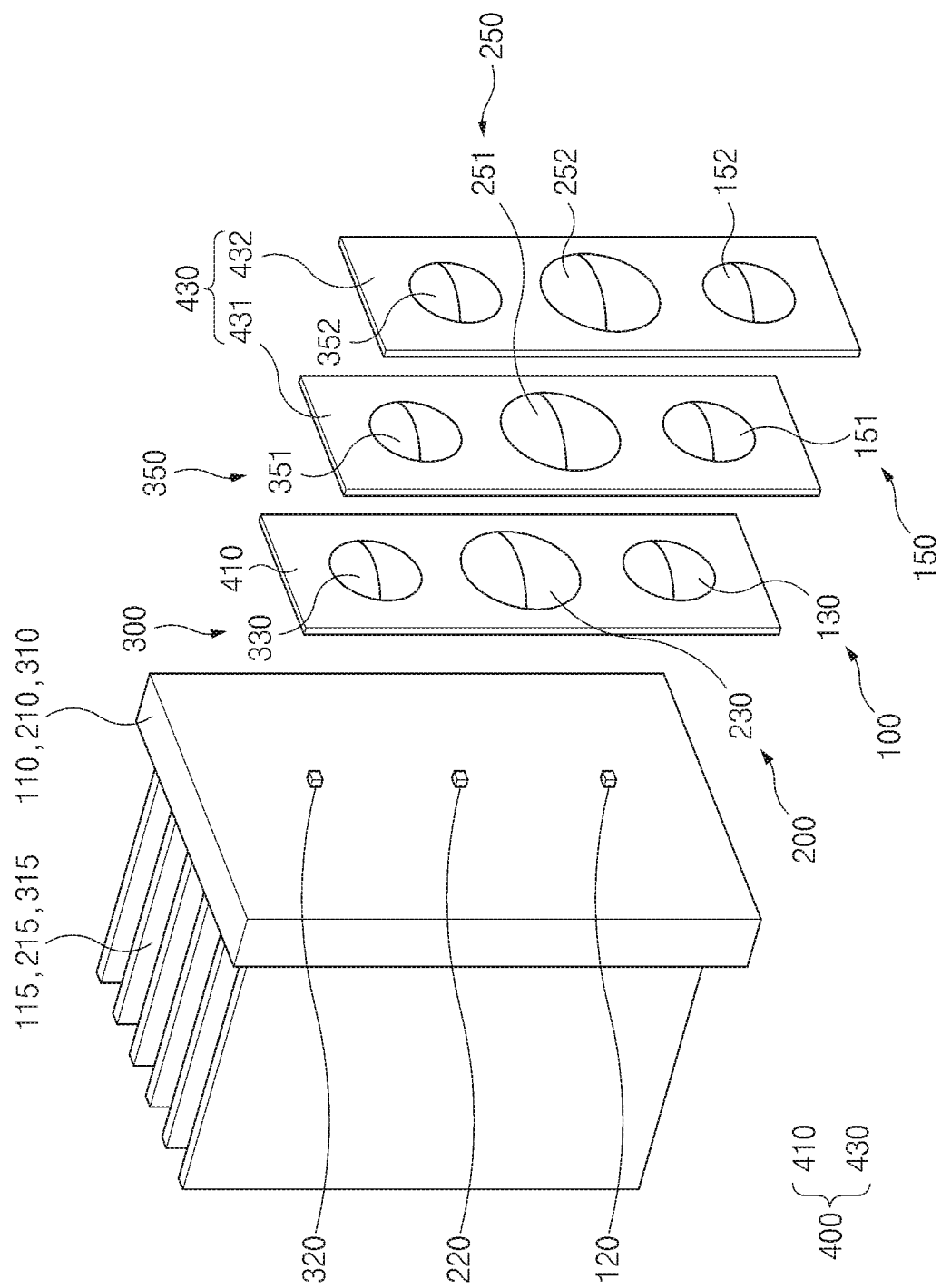
FIG. 5 is a perspective view illustrating a lamp for a vehicle illustrated in FIG. 3 with an assembly unit omitted.
Figure 8:
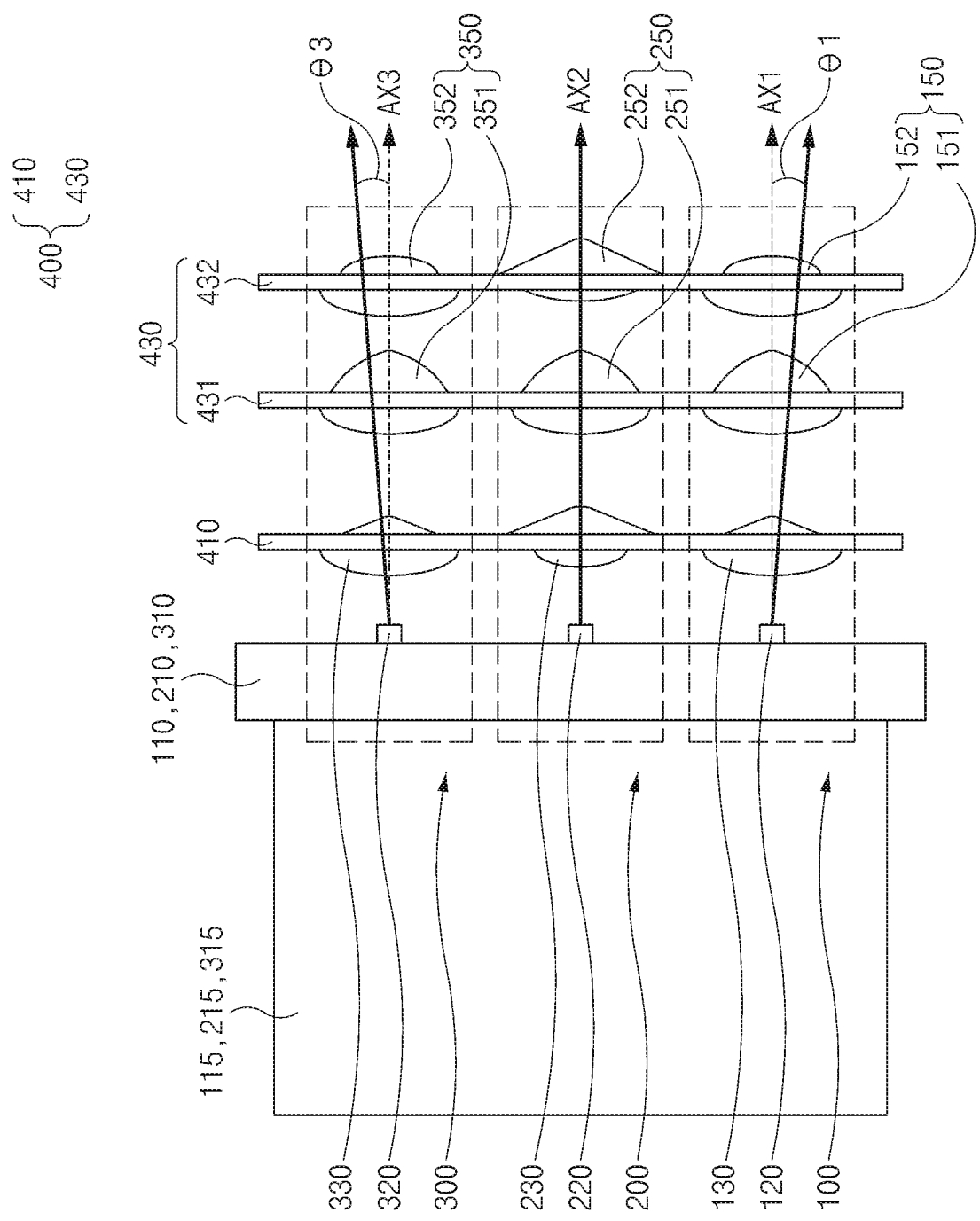
FIG. 8 is a side view of FIG. 5, viewed from a lateral side, and is a view illustrating optical axes and orientation angles of a first optical system, a second optical system, and a third optical system.
Figure 9:
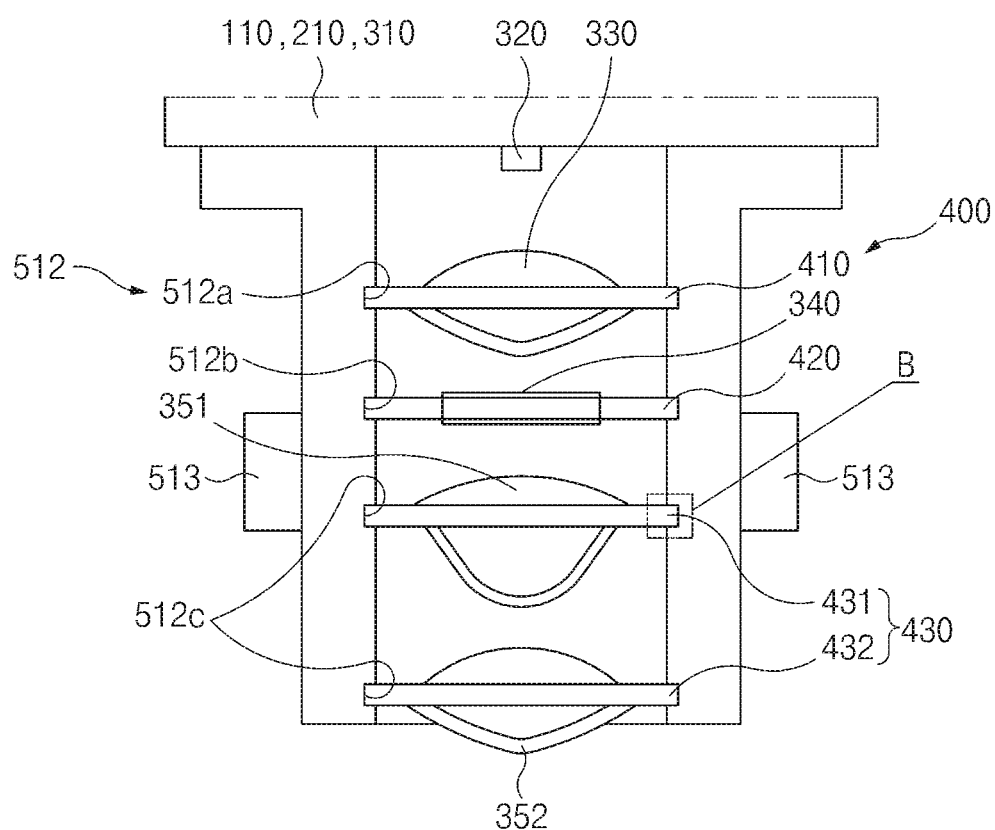
FIG. 9 is a top view of a lamp for a vehicle illustrated in FIG. 3, with a barrel clip omitted.
Figure 10:
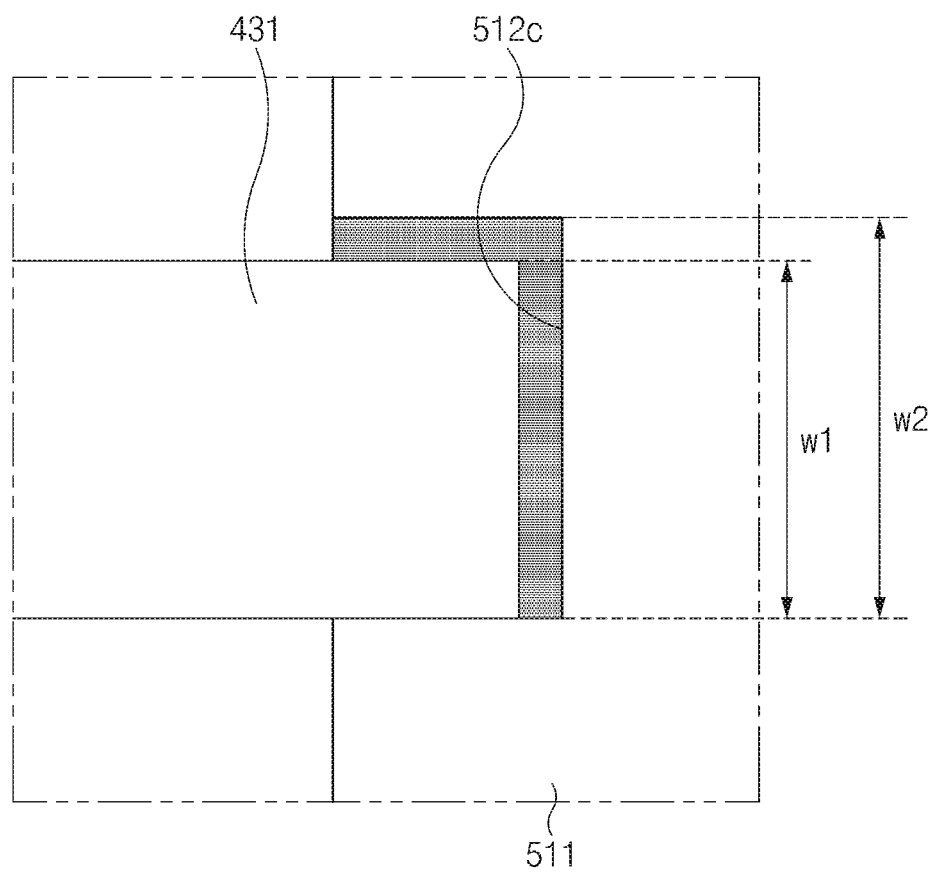
FIG. 10 is an enlarged view of part "B" of FIG. 9, and is a view illustrating a spacing space.

FIG. 8 is a side view of FIG. 5, viewed from a lateral side, and is a view illustrating optical axes and orientation angles of a first optical system, a second optical system, and a third optical system, FIG. 9 is a top view of the lamp for a vehicle illustrated in FIG. 3, with a barrel clip omitted, and FIG. 10 is an enlarged view of part "B" of FIG. 9, and is a view illustrating a spacing space.

Referring to FIGS. 1 to 10, a lamp for a vehicle according to an embodiment of the present disclosure includes an optical system and an assembly unit. The lamp for a vehicle according to an embodiment of the present disclosure may be used for the purpose of lighting functions (e.g., head lamps, fog lamps) or signaling functions (e.g., turn signal lamps, tail lamps, brake lamps, side markers), and the present disclosure is neither restricted nor limited by the purposes. For example, the lamp 10 for a vehicle 1 according to an embodiment of the present disclosure may be a welcome light that is provided in a headlamp, a rear lamp, or a puddle lamp. However, the lamp for a vehicle according to the present disclosure is not limited thereto.

A plurality of optical systems 100, 200, and 300 are provided to form a beam pattern "A" by irradiating light to a road surface 2. Furthermore, an assembly unit 500 is provided to assemble and integrate the plurality of optical systems 100, 200, and 300.

For example, the optical systems 100, 200, and 300 may be installed on the body of the vehicle and may irradiate light to the road surface 2 that is adjacent to the vehicle to form a pattern image of a specific shape. In detail, the beam pattern "A" may include a plurality of unit pattern areas A1, A2, and A3. Furthermore, each unit pattern area may be formed with light emitted from each of the plurality of optical systems 100, 200, and 300. That is, the beam pattern "A" may include the plurality of unit pattern areas A1, A2, and A3 implemented by the plurality of optical systems 100, 200, and 300, respectively. Then, light source parts 120, 220, and 320 that are provided in the plurality of optical systems 100, 200, and 300, respectively, may be driven individually. The plurality of unit pattern areas may overlap each other or be spaced apart from each other, and may be implemented with a time gap, and accordingly, the beam pattern "A" may be implemented as a three-dimensional pattern or a dynamic pattern (see FIG. 1).

The assembly unit 500 may assemble the plurality of optical systems 100, 200, and 300 and integrate them into one module. Accordingly, the plurality of optical systems 100, 200, and 300 may be provided in one lamp 10 for a vehicle.

Each of the plurality of optical systems 100, 200, and 300 includes the light source parts 120, 220, and 320, condensing lens parts 130, 230, and 330, shield parts 140, 240, and 340, and output lens parts 150, 250, and 350.

The light source parts 120, 220, and 320 generates light. For example, the light source parts 120, 220, and 320 may be light emitting diodes (hereinafter referred to as LEDs), but the present disclosure is not limited thereto.

The condensing lens parts 130, 230, and 330 are provided on a front side of the light source parts 120, 220, and 320 to condense and emit light input from the light source parts 120, 220, and 320. The condensing lens parts 130, 230, and 330 may condense the light irradiated from the light source parts 120, 220, and 320 and input it onto the shield parts 140, 240, and 340 provided on a front side. The condensing lens parts 130, 230, and 330 may convert the light emitted from the light source parts 120, 220, and 320 into light in a direction that is parallel to the optical axes, and may input it to the shield parts 140, 240, and 340 and the output lens parts 150, 250, and 350.

The shield parts 140, 240, and 340 are formed to shield a portion of the light input from the condensing lens parts 130, 230, and 330.

In detail, the shield parts 140, 240, and 340 are disposed on an output side that is a front side of the condensing lens parts 130, 230, and 330, and may be configured to form a specific beam pattern "A" by shielding a portion of the light. For example, the shield parts 140, 240, and 340 may be formed in a planar shape that is perpendicular to the optical axis, and a pre-designed light pattern may be implemented by shielding a portion of the light that is input in parallel by the condensing lens parts 130, 230, and 330.

In more detail, each of the shield parts 140, 240, and 340 may include a shield area and a through area. The shield area is an area that shields light, and the through area is an area, through which light passes to be output to the output lens parts 150, 250, and 350. The shield parts 140, 240, and 340 may cause an image of a pattern that is projected onto the road surface 2 to vary depending on a shape of the through area. For example, by using the shield parts 140, 240, and 340 of the present disclosure, not only simple patterns but also complex pattern images may be clearly implemented depending on the shape of the through area. Various image patterns may be implemented by this.

The output lens parts 150, 250, and 350 are configured to output the light that has passed through the shield parts 140, 240, and 340 onto the road surface 2.

Here, the output lens parts 150, 250, and 350 may include a plurality of lenses of different types. For example, the output lens parts 150, 250, and 350 may include a primary lens that is disposed on a front side of the shield parts 140, 240, and 340, and a secondary lens that is disposed on a front side of the primary lens and of a different type from that of the primary lens.

In the example illustrated in the drawing, the output lens parts 150, 250, and 350 includes two lenses, but is not limited thereto and may include one or three or more lenses. In this way, the output lens parts 150, 250, and 350 use a plurality of lenses, but by appropriately using different types of lenses, effects, such as improving aberration or increasing resolution to implement accurate image patterns may be achieved whereby an optical performance may be improved.

Here, an orientation angle of the light output from each of the plurality of optical systems 100, 200, and 300 to the road surface 2 may be formed differently.

In detail, optical structures of each of the plurality of optical systems 100, 200, and 300 may be formed differently, and accordingly, paths of the light in the optical systems 100, 200, and 300 may be different. Accordingly, the orientation angle of the light emitted from the output lens parts 150, 250, and 350 of each of the optical systems 100, 200, and 300 may be vary, and thus, an area, in which each of the optical systems 100, 200, and 300 irradiates the light to the road surface 2 may vary.

Accordingly, in the embodiment of the present disclosure, the plurality of optical systems 100, 200, and 300 that irradiate light to a plurality of areas may be implemented as one lamp 10 for a vehicle. Accordingly, various pattern images or dynamic pattern images may be implemented without adding a separate aiming structure.

Meanwhile, each of the optical systems 100, 200, and 300 may include board parts 110, 210, and 310 that are coupled to the assembly unit 500, and on which the light source parts 120, 220, and 320 are mounted. Furthermore, for example, each of the plurality of optical systems 100, 200, and 300 may be coupled to the board parts 110, 210, and 310 to emit heat generated from the light source parts 120, 220, and 320.

Here, the board parts 110, 210, and 310 provided in the plurality of optical systems 100, 200, and 300, respectively, may be integrally formed and be formed on the same plane. Furthermore, heat dissipating systems 115, 215, and 315 provided in the plurality of optical systems 100, 200, and 300, respectively, may be formed integrally.

Optical axes AX1, AX2, and AX3 of the light source parts 120, 220, and 320 provided in the plurality of optical systems 100, 200, and 300, respectively, may have the same angle with respect to the board parts 110, 210, and 310. In detail, the board parts 110, 210, and 310 may be integrally formed on a front side of the heat dissipating systems 115, 215, and 315, and the plurality of light source parts 120, 220, and 320 may be mounted on the board parts 110, 210, and 310. The optical axis directions of the light formed by the plurality of light source parts 120, 220, and 320 may be the same (see AX1, AX2, and AX3 in FIG. 8).

Furthermore, the output lens parts 150, 250, and 350, the condensing lens parts 130, 230, and 330, and the shield parts 140, 240, and 340 provided in any one of the plurality of optical systems 100, 200, and 300 may be formed to have different angles with respect to the board parts 110, 210, and 310, from those of the output lens parts 150, 250, and 350, the condensing lens parts 130, 230, and 330, the shield parts 140, 240, and 340 provided in the other optical systems.

In detail, the condensing lens parts 130, 230, and 330 provided in the plurality of optical systems 100, 200, and 300, respectively, may be disposed at different angles with respect to the board parts 110, 210, and 310. The shield parts 140, 240, and 340 provided in the plurality of optical systems 100, 200, and 300, respectively, may be disposed at different angles with respect to the board parts 110, 210, and 310. The output lens parts 150, 250, and 350 provided in the plurality of optical systems 100, 200, and 300, respectively, may be disposed at different angles with respect to the board parts 110, 210, and 310.

Due to the structure, the paths of the light irradiated from the light source parts 120, 220, and 320 in each of the optical systems may vary. Furthermore, accordingly, the orientation angles of the light output from the plurality of optical systems 100, 200, and 300 may be different.

Hereinafter, for convenience of description, a case, in which three optical systems are provided, will be described. For example, as in the illustrated embodiment, the lamp 10 for a vehicle may include the first optical system 100, the second optical system 200, and the third optical system 300. However, the number of the optical systems in the present disclosure is not limited to three, and may include two or four or more. In this case, the orientation angles of the light by the optical systems 100, 200, and 300 may be formed differently.

The first optical system 100 may be configured to form the first unit pattern area A1, and may include the first light source part 120, and the first condensing lens part 130 for condensing the light input from the first light source part 120, the first shield part 140 that shields a portion of the light output from the first condensing lens part 130, and the first output lens part 150 that outputs the light that has passed through the first shield part 140 to the road surface 2.

The first shield part 140 may include a shield area that shields light and a through area, through which the light passes. The first output lens part 150 may include a (1-1)-th lens 151 that is disposed on a front side of the first shield part 140, and a (1-2)-th lens 152 that is disposed on a front side of the (1-1)-th lens 151. Here, the (1-1)-th lens 151 and the (1-2)-th lens 152 may include different types of lenses.

Furthermore, the first optical system 100 may further include the first board part 110, on which the first light source part 120 is mounted, and the first heat dissipating system 115 that is provided on a rear side of the first board part 110 and emits heat that is generated in the first light source part 120.

The second optical system 200 is provided to form a second unit pattern area A2, and may include a second light source part, the second condensing lens part 230 for condensing the light input from the second light source part, the second shield part 240 that shields a portion of the light output from the second condensing lens part 230, and the second output lens part 250 that outputs the light that has passed through the second shield part 240.

The second shield part 240 may include a shield area that shields light and a through area, through which the light passes. The second output lens part 250 includes a (2-1)-th lens 251 that is disposed on a front side of the second shield part 240, and a (2-2)-th lens 252 that is disposed on a front side of the (2-1)-th lens 251. Here, the (2-1)-th lens 251 and the (2-2)-th lens 252 may include different types of lenses.

The (1-1)-th lens 151, the (2-1)-th lens 251, and a (3-1)-th lens 351 may correspond to the above-described primary lenses. Furthermore, the (1-2)-th lens 152, the (2-2)-th lens 252, and a (3-2)-th lens 352 may correspond to the above-described secondary lenses.

Furthermore, the second optical system 200 may further include the second board part 210, on which the second light source part is mounted, and the second heat dissipating system 215 that is provided on a rear side of the second board part 210 and dissipates heat generated in the second light source part.

The optical system 300 is configured to form a third unit pattern area A3, and may include the third light source part 320, the third condensing lens part 330 for condensing light that is from the third light source part 320, the third shield part 340 that shields a portion of the light output from the third condensing lens part 330, and the third output lens part 350 that outputs the light that has passed through the third shield part 340 to the road surface 2.

The third shield part 340 may include a shield area that shields light and a through area, through which the light passes. The third output lens part 350 includes a (3-1)-th lens 351 that is disposed on a front side of the third shield part 340, and a (3-2)-th lens 352 that is disposed on a front side of the (3-1)-th lens 351. Here, the (3-1)-th lens 351 and the (3-2)-th lens 352 may include different types of lenses.

Furthermore, the third optical system 300 may further include the third board part 310, on which the third light source part 320 is mounted, and the third heat dissipating system 315 that is provided on a rear side of the third board part 310 and dissipates the heat generated in the third light source part 320.

Here, the first board part 110, the second board part 210, and the third board part 310 may be integrally formed. Furthermore, the first heat dissipating system 115, the second heat dissipating system 215, and the third heat dissipating system 315 may be integrally formed (see FIGS. 3 to 5). The disposition of the first to third board parts 110, 210, and 310 and the first to third heat dissipating systems 115, 215, and 315 is not limited thereto.

Furthermore, as described above, an angle that is defined by the first board part 110 and the first condensing lens part 130, an angle that is defined by the second board part 210 and the second condensing lens part 230, and an angle defined by the third board part 310 and the third condensing lens part 330 may be formed differently. Here, the first condensing lens part 130, the second condensing lens part 230, and the third condensing lens part 330 may be lenses of the same type.

Furthermore, an angle that is defined by the first board part 110 and the (1-1)-th lens 151, an angle that is defined by the second board part 210 and the (2-1)-th lens 251, and an angle that is defined by the third board part 310 and the (3-1)-th lenses 351 may be formed differently. Here, the (1-1)-th lens 151, the (2-1)-th lens 251, and the (3-1)-th lens 351 may be lenses of the same type.

Furthermore, an angle that is defined by the first board part 110 and the (1-2)-th lens 152, an angle that is defined by the second board part 210 and the (2-2)-th lens 252, and an angle that is defined by the third board part 310 and the (3-2)-th lens 400 may be formed differently. Here, the (1-2)-th lens 152, the (2-2)-th lens 252, and the (3-2)-th lens 352 may be lenses of the same type.

Furthermore, here, the first shield part 140, the second shield part 240, and the third shield part 340 may be disposed at an appropriate angle to correspond to the optical paths in the optical systems 100, 200, and 300. Furthermore, shapes of a pass area of the first shield part 140, a pass area of the second shield part 240, and a pass area of the third shield part 340 may be formed to be the same or different depending on a shape of the beam pattern "A".

Due to this structure, the optical path of the first optical system 100, the optical path of the second optical system 200, and the optical path of the third optical system 300 may be implemented differently. Accordingly, the orientation angle of the first optical system 100, the orientation angle of the second optical system 200, and the orientation angle of the third optical system 300 may be formed differently.

For example, referring to FIG. 8, the optical axis AX1 of the first optical system 100, the optical axis AX2 of the second optical system 200, and the optical axis AX3 of the third optical system 300 may be formed in the same direction. In FIG. 8, 01 is an orientation angle of the first optical system 100, and 03 is an orientation angle of the third optical system 300. The second optical system 200 will be omitted because an orientation angle thereof is almost the same as that of the direction of the optical axis AX2. As illustrated, the first optical system 100, the second optical system 200, and the third optical system 300 have different orientation angles, and thus, a direction, in which the light is irradiated to the road surface 2 may become different.

The assembly unit 500 may include a lens barrel 510 that is coupled to the board parts 110, 210, and 310 and includes a slit part 512 for assembling the condensing lens parts 130, 230, and 330, the shield parts 140, 240, and 340, and the output lens parts 150, 250, and 350.

In detail, the lens barrel 510 may include a pair of assembly plates 511, a coupling plate 515, and a lower plate 517.

In the pair of assembly plates 511, the slit parts 512 that extend in the upward/downward direction may be formed concavely on facing surfaces thereof.

The coupling plate 515 may be bent and extended from a rear end of the assembly plate 511 and be coupled to the board part. Furthermore, the lower plate 517 may be provided at a lower end of the assembly plate 511.

Accordingly, an upper surface and a front surface of the lens barrel 510 may be opened in a state, in which the lens barrel 510 is coupled to front surfaces of the board parts 110, 210, and 310. The assembly plate 511, the coupling plate 515, and the lower plate 517 may be integrally formed.

The slit part 512 may include a plurality of slits, and the plurality of slits may be formed concavely on facing surfaces of a pair of assembly plates 511, and may be formed long in the upward/downward direction.

Furthermore, the lamp 10 for a vehicle may further include a flange part 400 that is accommodated in the lens barrel 510, and an end of which is inserted into the slit part 512. The flange part 400 is a component that connects the components provided in the plurality of optical systems 100, 200, and 300 and facilitates assembly. The first optical system 100, the second optical system 200, and the third optical system 300 applied to the present disclosure are formed into an integral module by the lens barrel 510, the flange part 400, and a barrel clip 530.

In detail, the flange part 400 may include the board parts 110, 210, and 310, a shield flange 420, and an output lens flange 430.

A condensing lens flange 410 may connect the condensing lens parts 130, 230, and 330 provided in the plurality of optical systems 100, 200, and 300, respectively, and may be formed in a plate shape. In detail, the plurality of condensing lens parts 130, 230, and 330 may be formed integrally with the condensing lens flange 410, and may be provided on the condensing lens flange 410 with a pre-designed shape and angle. For example, during manufacturing thereof, the condensing lens flange 410 and the condensing lens parts 130, 230, and 330 may be integrally molded.

As an example, referring to the embodiment illustrated in FIGS. 4 to 9, the first condensing lens part 130, the second condensing lens part 230, and the third condensing lens part 330 may be arranged in the condensing lens flange 410 in the upward/downward direction and may be formed integrally.

The shield flange 420 connects the shield parts 140, 240, and 340 provided in the plurality of optical systems, respectively, and may be formed in a plate shape. In detail, the plurality of shield parts 140, 240, and 340 may be formed integrally with the shield flange 420, and may be provided on the shield flange 420 with pre-designed shapes and angles. For example, during manufacturing thereof, the shield flange 420 and the plurality of shield parts 140, 240, and 340 may be integrally molded.

As an example, referring to the embodiment illustrated in FIGS. 4 to 9, the first shield part 140, the second shield part 240, and the third shield part 340 may be arranged in the upward/downward direction on the shield flange 420, and may be integrally formed.

The output lens flange 430 may be formed in a plate shape that connects the output lens parts 150, 250, and 350 provided in the plurality of optical systems, respectively. In detail, the plurality of output lens parts 150, 250, and 350 may be formed integrally with the output lens flange 430, and may be provided on the output lens flange 430 with a pre-designed shape and angle. For example, during manufacturing thereof, the output lens flange 430 and the plurality of output lens parts 150, 250, and 350 may be integrally molded.

As an example, referring to the embodiment illustrated in FIGS. 4 to 9, the first output lens part 150, the second output lens part 250, and the third output lens part 350 may be arranged in the upward/downward direction in the output lens flange 430, and may be integrally formed. Here, when the output lens part includes two lenses of a primary lens and a secondary lens, the output lens flange 430 may include a primary output lens flange 431 and a secondary output lens flange 432.

Because the components of the optical systems 100, 200, and 300 are formed on the flange part 400 with a pre-designed angle, no additional aiming structure is required, and an assembly performance and a workability may be improved.

Meanwhile, the slit part 512 may include a condensing slit 512a, a shield slit 512b, and an output lens slit 512c.

A periphery of the condensing lens flange 410 may be inserted into the condensing slit 512a. Furthermore, a periphery of the shield flange 420 that is formed to be spaced apart from the condensing slit 512a on a front side of the condensing slit 512a may be inserted into the shield slit 512b. Furthermore, a periphery of the output lens flange 430 that is formed to be spaced apart from the shield slit 512b on a front side of the shield slit 512b may be inserted into the output lens slit 512c. For reference, in FIGS. 4, 5, and 8, the shield flange 420, the first shield part 140, the second shield part 240, and the third shield part 340 are omitted.

Here, when the optical system and the assembly unit 500 are assembled, a spacing space may be formed between an outer surface of the flange part 400 and an inner surface of the slit part 512. This is for improving an assembly performance of the flange part 400 and the slit part 512.

In detail, widths of the condensing lens flange 410, the shield parts 140, 240, and 340, and the output lens part in the forward/rearward direction are smaller than widths of the condensing slit 512a, the shield slit 512b, and the output lens slit 512c in the forward/rearward direction.

Referring to an example illustrated in FIG. 10, a width w1 of the primary output lens flange 431 in the forward/rearward direction may be smaller than a width w2 of the output lens slit 512c in the forward/rearward direction.

Furthermore, for example, widths of the condensing lens flange 410, the shield flange 420, and the output lens flange in the leftward/rightward direction are formed to be smaller than a distance between the condensing slits 512a that face each other, and a distance between shield slits 512b that face each other, and a distance between the output lens slits 512c that face each other.

For example, the width of the output lens flange 430 in the leftward/rightward direction may be smaller than the distance between facing surfaces of the pair of output lens slits 512c.

A spacing space may be formed between the flange part 400 and the slit part 512 due to the above-described structure. Accordingly, an assembly performance may be improved when the flange part 400 is assembled in the lens barrel 510. However, due to this spacing space, a location of the flange part 400 may be changed in an interior of the lens barrel 510 after the assembly thereof. To solve this problem, a configuration for fixing the flange part 400 as will be described later may be included.

In detail, the assembly unit 500 may include the barrel clip 530 and a fixing pad part 540.

The barrel clip 530 may be assembled on an upper side of the lens barrel 510. For example, the barrel clip 530 may be configured to cover an upper side of the lens barrel 510, and may be inserted into and coupled to the lens barrel 510.

In detail, the lens barrel 510 may include an insertion boss 513 that protrudes from an outer surface of the assembly plate 511. Furthermore, the barrel clip 530 may include a cover part 531 that covers an upper side of the lens barrel 510 and presses the fixing pad part 540, and an insertion part 532 that extends downward from an end of the cover part 531 in the leftward/rightward direction and is inserted into and coupled to the insertion boss 513.

The insertion boss 513 and the insertion part 532 may be coupled to each other through a hook coupling scheme. The lamp 10 for a vehicle may be completely assembled by coupling the barrel clip 530 and the lens barrel 510.

The fixing pad part 540 include a porous material that is interposed between the lens barrel 510 and the barrel clip 530 and is elastic and flexible. For example, the fixing pad part 540 may include sponge, but the material of the fixing pad part 540 is not limited thereto.

Here, the fixing pad part 540 may be deformed by a pressing force by the barrel clip 530 and be inserted into the spacing space to fix a location of the flange part 400 when the plurality of optical systems 100, 200, and 300 and the assembly unit 500 are assembled.

In detail, because the fixing pad part 540 includes a flexible and elastic material, an area corresponding to the spacing space in the entire area of the fixing pad part 540 may be inserted into the spacing space when the barrel clip 530 is assembled in the lens barrel 510. That is, as the fixing pad part 540 is pressed by the cover part 531 of the barrel clip 530, a partial of the fixing pad part 540 may be interference-fitted in the spacing space.

In this way, a partial of the fixing pad part 540 may be interference-fitted in the spacing space, and a location of the flange part 400 may be fixed while a lower surface of the fixing pad part 540 presses an upper surface of the flange part 400. Accordingly, the locations of the plurality of condensing lens parts 130, 230, and 330, the plurality of shield parts 140, 240, and 340, and the plurality of output lens parts 150, 250, and 350 may be fixed even after the assembly, and an optical performance and a product value thereof may be improved accordingly.

An embodiment of the present disclosure may be implemented by a lamp for a vehicle, in which a plurality of optical systems that irradiate light to a plurality of areas are integrally formed. Accordingly, various pattern images or dynamic pattern images may be implemented without adding a separate aiming structure.

Although the specific embodiments of the present disclosure have been described in detail above, the spirit and scope of the present disclosure are not limited to these specific embodiments, and various modifications and variations may be made by an ordinary person in the art, to which the present disclosure pertains, while not changing the essence of the present disclosure described in the claims.

What is claimed is:

1. A lamp for a vehicle, the lamp comprising:
a plurality of optical systems configured to form a beam pattern by irradiating light onto a road surface; and
an assembly unit configured to assemble and integrate the plurality of optical systems,
wherein each of the plurality of optical systems includes:
a light source part configured to generate light;
a condensing lens part provided on a front side of the light source part and configured to condense and output the light input from the light source part;
a shield part formed to shield a portion of the light input from the condensing lens part; and
an output lens part configured to output the light passing the shield part to the road surface,
wherein the beam pattern includes a plurality of unit pattern areas formed by the plurality of optical systems, respectively, and
wherein orientation angle of light output from each of the plurality of optical systems on to the road surface is different from one another.

2. The lamp of claim 1,
wherein the each of the plurality of optical systems includes a board part coupled to the assembly unit, the light source part being mounted on the assembly unit,
wherein the board parts provided in the plurality of optical systems are integrally formed on the same plane,
wherein optical axes of the light source parts provided in the plurality of optical systems are formed to define the same angle with respect to the board parts, and
wherein angles of the output lens part, the condensing lens part, and the shield part provided in any one optical system with respect to the board part are formed to be different from angles of the output lens part, the condensing lens part, and the shield part provided in the other optical systems with respect to the board part.

3. The lamp of claim 2,
wherein the assembly unit includes a lens barrel coupled to the board part, and
wherein the lens barrel includes a slit part for assembling the condensing lens part, the shield part, and the output lens part.

4. The lamp of claim 3, further comprising:
a flange part accommodated in the lens barrel, and an end of which is inserted into the slit part,
wherein the flange part includes:
- a plate-shaped condensing lens flange connecting the condensing lens parts provided in the plurality of optical systems, respectively;
- a plate-shaped shield flanges connecting the shield parts provided in the plurality of optical systems, respectively; and
- a plate-shaped output lens flange connecting the output lens parts provided in the plurality of optical systems, respectively.

5. The lamp of claim 4, wherein the lens barrel includes:
a pair of assembly plates, in which the slit parts extending in an upward/downward direction are formed concavely on facing surfaces thereof;
a coupling plate bent and extending from a rear end of the assembly plate, and coupled to the board part; and
a lower plate provided at a lower end of the assembly plate.

6. The lamp of claim 5, wherein the slit parts include:
a condensing lens slit, in which a periphery of the condensing lens flange is inserted;
a shield slit, into which a periphery of the shield flange formed on a front side of the condensing lens slit to be spaced apart therefrom is inserted; and
an output lens slit, into which a periphery of the output lens flange formed on a front side of the shield slit to be spaced apart therefrom is inserted.

7. The lamp of claim 6, wherein a spacing space is formed between an outer surface of the flange part and an inner surface of the slit part is formed when the optical system and the assembly unit are assembled.

8. The lamp of claim 7,
wherein the assembly unit includes:
- a barrel clip assembled on an upper side of the lens barrel; and
- a fixing pad part interposed between the lens barrel and the barrel clip, and including a porous material being elastic and flexible, and
wherein the fixing pad part is configured to be deformed by a pressing force by the barrel clip and be inserted into the spacing space to fix a location of the flange part when the plurality of optical systems and the assembly unit are assembled.

9. The lamp of claim 8, wherein the lens barrel includes:
an insertion boss protruding from an outer surface of the assembly plate,
wherein the barrel clip includes:
- a cover part covering an upper side of the lens barrel, and configured to press the fixing pad part; and
- an insertion part extending downward from an end of the cover part in a leftward/rightward direction, and inserted into and coupled to the insertion boss.

10. The lamp of claim 1,
wherein the output lens part includes:
- a primary lens disposed on a front side of the shield part; and
- a second lens disposed on a front side of the primary lens, and a type of which is different from that of the primary lens, wherein types of the condensing lens parts respectively provided in the plurality of optical systems are the same,
wherein types of the shield parts respectively provided in the plurality of optical systems are the same, and
wherein types of the output lens parts respectively provided in the plurality of optical systems are the same.

11. A method of irradiating light by a vehicle, the method comprising:
providing a plurality of optical systems configured to forming a beam pattern by irradiating light onto a road surface;
providing an assembly unit configured to assemble and integrate the plurality of optical systems;
generating light by a light source of each of the optical systems;
outputting the light input from the light source part by a condensing lens part provided on a front side of the light source part of each of the optical systems;
shielding a portion of the light input from the condensing lens part by a shield part; and
outputting the light passing the shield part to the road surface an output lens part of each of the optical systems,
wherein the beam pattern includes a plurality of unit pattern areas formed by the plurality of optical systems, respectively, and
wherein orientation angle of light output from each of the plurality of optical systems on to the road surface is different from one another.

12. A lamp for a vehicle, the lamp comprising:
a plurality of optical systems configured to form a beam pattern by irradiating light onto a road surface;
a processor configured to control the plurality of optical systems; and
an assembly unit configured to assemble and integrate the plurality of optical systems,
wherein each of the plurality of optical systems includes:
- a light source part configured to generate light;
- a condensing lens part provided on a front side of the light source part and configured to condense and output the light input from the light source part;
- a shield part formed to shield a portion of the light input from the condensing lens part; and
- an output lens part configured to output the light passing the shield part to the road surface, and
wherein the processor is further configured to:
control the plurality of optical systems to form a plurality of pattern areas of the beam pattern,
control orientation angle of light output from each of the plurality of optical systems on to the road surface to be different from one another.

13. The lamp of claim 12, wherein the processor is further configured to adjust intensity of light generated by the light source part of each of the plurality of optical systems.

14. The lamp of claim 13, wherein light intensity of the plurality of pattern areas of the beam pattern is uniform.

15. The lamp of claim 13, wherein light intensity of the plurality of pattern areas of the beam pattern is non-uniform.

* * * * *